W. K. DIETRICH.
MEAT-CURING APPARATUS.
No. 173,599. Patented Feb. 15, 1876.
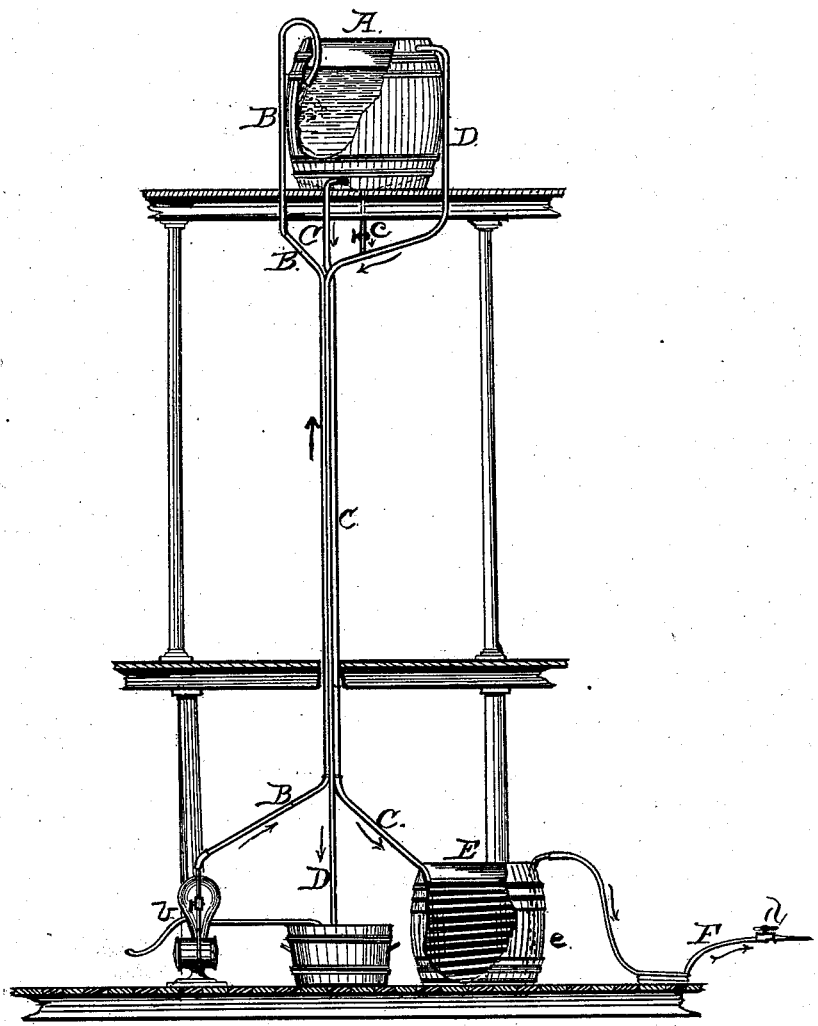

UNITED STATES PATENT OFFICE.

WILLIAM K. DIETRICH, OF SAN FRANCISCO, CALIFORNIA.

IMPROVEMENT IN MEAT-CURING APPARATUS.

Specification forming part of Letters Patent No. 173,599, dated February 15, 1876; application filed January 6, 1876.

*To all whom it may concern:*

Be it known that I, WILLIAM K. DIETRICH, of San Francisco, State of California, have invented an Improved Apparatus for Curing Hams and other Meats, of which the following is a specification:

My invention relates to an improvement in apparatus for curing meats, wherein the brine is applied by hydrostatic pressure; and consists in attaching to the pressure-pipe a refrigerating-coil; and, further, in the combination of the several parts composing my apparatus, all as more fully hereinafter explained.

The accompanying drawing illustrates the arrangement of the apparatus in a curing establishment, and shows the floors in section.

The reservoir or tank A is elevated at a distance above the cellar or curing-room of not less than twenty-five feet, or at such height as to insure a proper pressure upon the column of the liquid in the supply-pipe. A pipe, B, connected with a forcing-pump, b, placed on the lower floor, leads up into the reservoir, and conducts the brine from the source of supply in the cellar or curing-room through the floors into the tank. Connected with the reservoir A is an overflow-pipe, D, that leads from near the top of the tank down into the pickle-tub.

C is the service or supply pipe, connected with the reservoir A a distance of about three inches from the bottom. It conducts the pickle or brine down to the curing-floor, and it is connected with a refrigerating-coil, E, in the tank e. This pipe E is coiled in the bottom and around the sides of the tank e, with spaces enough in the center to hold one hundred pounds of ice, and refrigerate the pickle, so that it shall enter the meat at a low temperature to expel all animal heat.

F is a hose, having an ejecting-nozzle, d, that leads from the coil E, and is used to conduct the pickle from the refrigerating-tub, and inject it into the hams. The nozzle d has a stop-cock to regulate the flow of the liquid.

A short pipe, c, with a valve or stop-cock, leads from the bottom of the cask or tank A to the overflow-pipe D for the purpose of drawing off the sediment through the overflow-pipe D.

Either hose or galvanized-iron pipe may be used for the pipes B C D, according to the power of the pump, and suitable stop-cocks are provided to govern the flow of the liquid.

The overflow-pipe D empties into the pickle-tub on the curing-room floor, and shows when the reservoir is full by the flowing of the brine back into the tub. It also serves to cleanse out the reservoir by allowing the sediment to be drawn off through it by means of the branch pipe c.

The process at present employed in the curing of meats uses a force-pump connected directly with the hose and injecting-nozzle, and the pickle is forced into the flesh in spirts, together with a large quantity of atmospheric air, after tearing the fibers apart, and causing the meat to assume a puffed and unhealthy appearance, and to become tainted and decay prematurely by reason of the air; but in my process above described the brine is injected under a uniform pressure, with no admixture of air, and the flow of the pickle is always regular and under full control. The liquid consequently penetrates all the fibers of the meat without affecting the natural appearance of the flesh.

The pickle is pumped up into the reservoir and allowed to stand several hours to settle before being used.

Having thus fully described my invention, what I claim, and desire to secure by Letters Patent, is—

1. In an apparatus for curing meats by hydrostatic pressure, the combination, with the supply-pipe C, of the refrigerating-coil E, whereby the brine is brought to a low temperature before being applied to the meat, substantially as described.

2. An apparatus for curing meats, wherein the tank A, force-pump b, pipe B, supply-pipe C, refrigerating-coil E, hose F, and overflow-pipe D are combined and arranged to operate substantially as described and shown.

In witness whereof I have hereunto set my hand and seal this 20th day of December, 1875.

WILLIAM K. DIETRICH. [L. S.]

In presence of—
C. W. M. SMITH,
G. E. SCHENCK.